April 23, 1957 — G. THEOCLITUS — 2,789,793
FLOATING CONNECTING PLATE FOR ROTARY PREHEATER
Filed Nov. 14, 1952 — 2 Sheets-Sheet 1

INVENTOR.
GREGORY THEOCLITUS
BY
ATTORNEY

April 23, 1957        G. THEOCLITUS        2,789,793
FLOATING CONNECTING PLATE FOR ROTARY PREHEATER
Filed Nov. 14, 1952        2 Sheets-Sheet 2
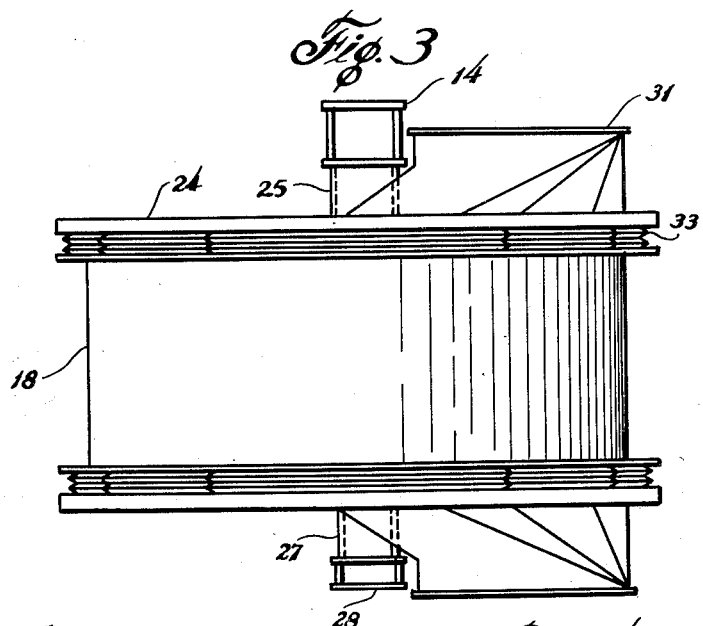
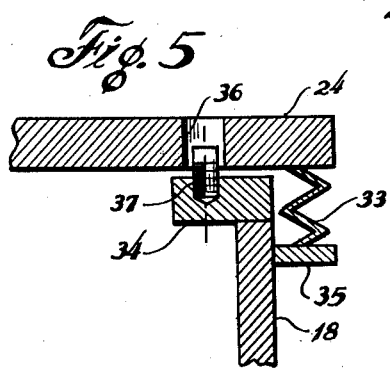
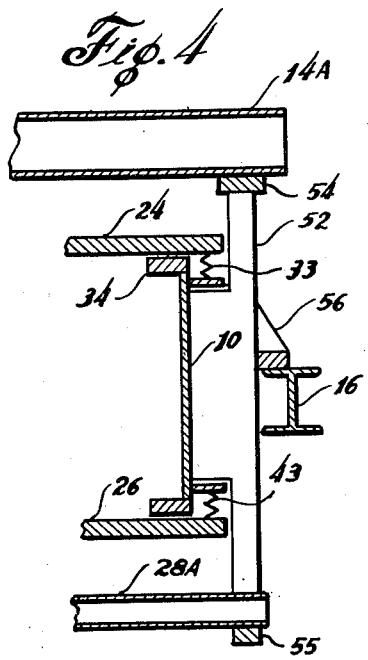
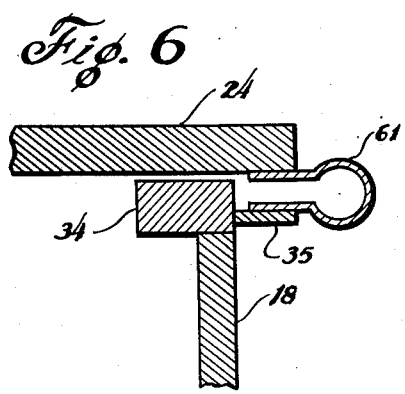
INVENTOR.
Gregory Theoclitus
BY
ATTORNEY

United States Patent Office 2,789,793
Patented Apr. 23, 1957

2,789,793

FLOATING CONNECTING PLATE FOR ROTARY PREHEATER

Gregory Theoclitus, Wellsville, N. Y., assignor to The Air Preheater Corporation, New York, N. Y.

Application November 14, 1952, Serial No. 320,541

4 Claims. (Cl. 257—6)

The present invention relates to improvements in regenerative heat exchange apparatus of the rotary type and particularly to minimizing stresses on casings and supporting structures of such apparatus. These stresses often become highly significant when the structural members of the apparatus are become subjected to wide temperature variations.

In a rotary regenerative heater a cylindrical rotor has compartments carrying metallic heat transfer plates which, as the rotor turns are first exposed to hot gases and are then disposed in an air passage to impart the absorbed heat to the air passing therethrough. The rotor is surrounded by a housing having end or sector plates formed with openings therein to provide for the passage of gas and air. To prevent mingling of the gas and air, radial partitions forming the rotor compartments are provided with radial seals that wipe against the imperforate sections of the sector plates.

In many heat exchangers of this type, the rotor housing and the structural steel work which support the heat exchange apparatus become subjected to strains because of unequal expansion or contraction as the various portions of the apparatus become heated or cooled. The present invention is therefore directed toward an arrangement involving a novel floating type mounting by which thermal stresses on the casing and supporting structure are minimized while at the same time an efficient seal is maintained between the air and the gas passages.

The invention will be best understood upon consideration of the following detailed description of illustrative embodiments thereof when read in conjunction with the accompanying drawings in which:

Figure 3 is a side elevation.

Figure 4 is a sectional elevation of an alternate supporting arrangement.

Figure 5 is a detail sectional view of a sealing arrangement.

Figure 6 is a detail sectional view of an alternate sealing arrangement.

Figure 1:
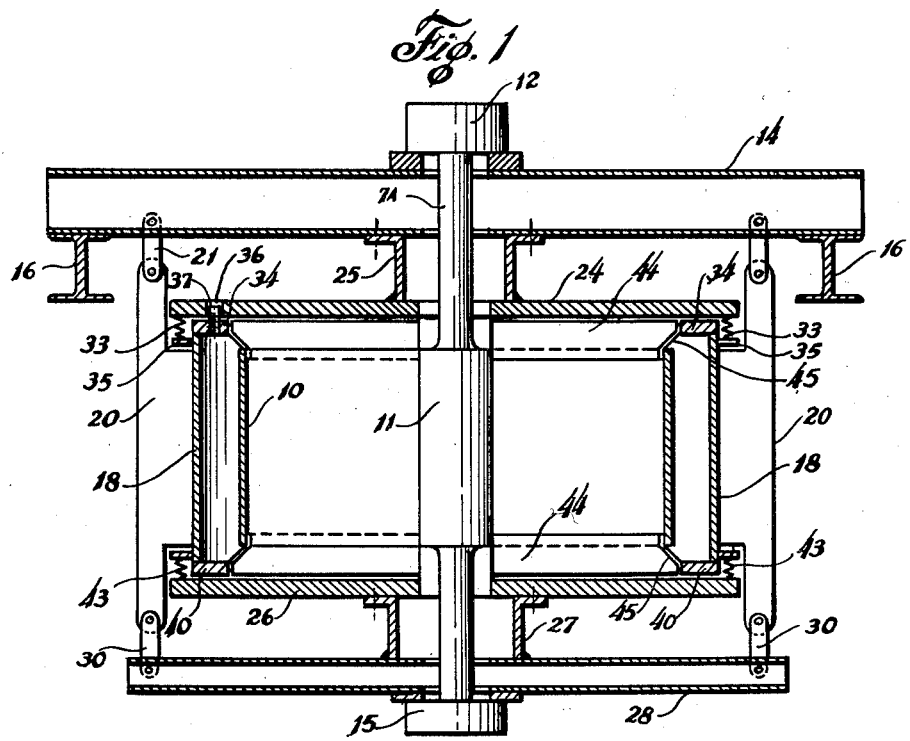
Figure 1 is a sectional elevation showing the air preheater with respect to a special supporting beam provided according to the invention.

Referring to Figure 1, the rotor 10 which is built around a rotor shaft 11 is independently suspended by a support bearing 12 mounted above the opening 13 centered in the upper transverse support beam 14 and steadied at the bottom by a guide bearing 15. The upper support beam 14 may be supported upon any suitable available means such as a building girder 16.

The rotor housing 18 is joined to a plurality of diametrically spaced support ribs 20 which are pivotally suspended from the upper support beam 14 through the support links 21. By such a linkage it is to be seen that both the rotor 10 and the rotor housing 16 are independently suspended from the upper support beam 14 and both said members are therefore free to contract or expand relative to one another.

The upper end plate 24 is suspended from the support beam 14 by the upper center tube 25 which is rigidly joined to both members. The lower end plate 26 is supported by the guide beam 28 through the lower center tube 27. The guide beam 28 also supports the previously mentioned guide bearing 15 for the rotor post assembly 11, and it is in turn supported by the housing support ribs 20 through the lower pivoted support links 30.

Figure 2:
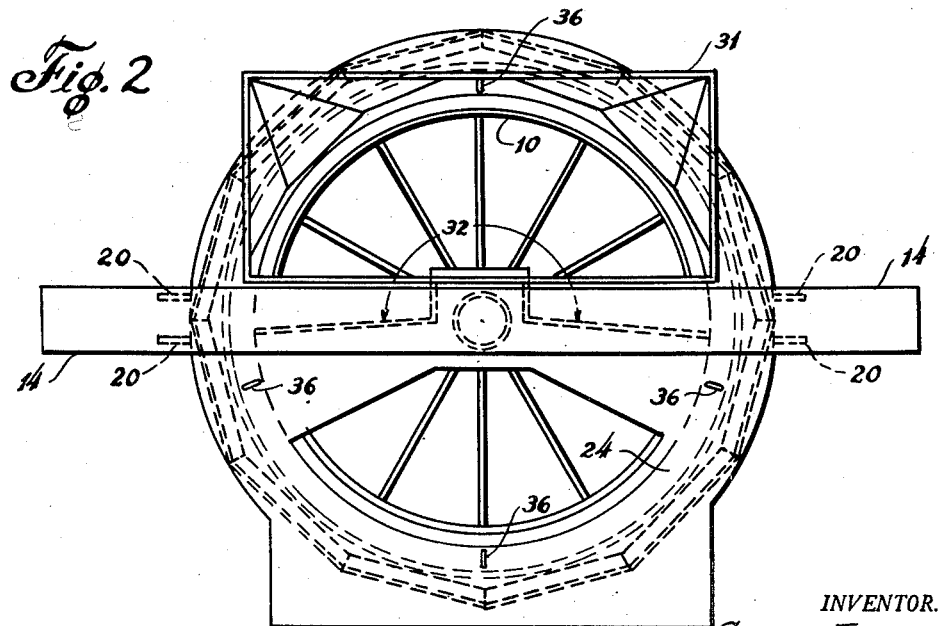
Figure 2 is a top plan view of the air preheater.

The upper and lower end plates 24 and 26 have transition pieces 31 in the duct work on the gas side only. This is made necessary because the upper support beam 14 and the lower support beam 28 overlap the gas openings 32 of both end plates in the manner shown by Figure 2. The air ducts may be bolted directly to the air side of both end plates.

The upper end plate 24 is rigidly connected to the upper center tube 25 so as to extend radially therefrom slightly above the circular housing flange 34. However, due to the flexibility of the end plate 24 it may bow slightly so as to come to rest at its outer periphery upon the housing flange 34. Leakage through the joint formed by end plate 24 resting upon housing flange 34 is prevented by the expansion joint 33 which is continuously joined along its top edge to the end plate 24 and at its lower edge to the expansion joint flange 35 which is then bonded to one end of the housing 18. By the use of this type of expansion joint the housing 18 and the upper end plate 24 will be free to expand and contract relative to one another. There will be no distortion caused by a rigid connection between two differently expanding members.

Radially slotted holes 36 in the upper end plate 24 receive studs 37 rigidly fastened to the housing flange 34 so as to allow radial expansion and relative radial motion between the upper end plate 24 and housing 18 at the same time preventing transverse relative motion. The lower guide beam 28 is indirectly suspended through the support links 30 which are pivotally connected to the support ribs 20. The support ribs 20 are in turn joined to upper pivoted supports 21 and thence to the upper support beam 14. Such a pivoted connection between upper support beam 14 and guide beam 28 prevents the transfer of any stresses and related distortion between the upper and lower beams and the housing, and consequently permits unrestricted movement of the rotor member.

The lower end plate 26 is rigidly connected to the lower beam 28 through the lower center tube 27 so as to prevent any relative movement between the beam and the end plate. The lower end plate is also guided loosely from the lower housing flange 40 with studs through the radial expansion slots as described for the upper end plate so as to allow for relative radial movement between the flange 40 and the end plate 26. The sealing between the lower end plate 26 and the housing 18 is accomplished by means of the lower expansion joint 43 which is joined to both the end plate 26 and the housing 18 in the manner described for the upper expansion joint 33. Internal leakage from high to low pressure areas is minimized by the radial seals 44 and the circumferential seals 45 which are of the usual type commonly used in such applications.

Figure 4 illustrates a different means for supporting the air preheater of this invention. In this variation, the upper support beam 14A is supported upon the support beam pad 54 which rests upon the upper ends of the housing support ribs 52. The lower beam 28A also rests upon the lower beam pad 55 which is in turn carried at the lower ends of the housing support ribs 52. The entire structure then rests upon the steel work of the building girder 16 through housing support feet 56.

Figure 6 illustrates an alternate expansible sealing means 61 which may be used under conditions where there is a minimum of relative movement between the end plate 24 and the housing 18.

What I claim is:

1. Rotary regenerative heat exchange apparatus including a cylindrical rotor carrying regenerative heat transfer material; a cylindrical housing concentric with the rotor having upper and lower end plates providing end walls therefor; flexible connecting means between said housing and end plates permitting relative movement therebetween; means supporting the rotor housing comprising a plurality of axially extending support ribs secured thereto and mounted outwardly on independent support structure; an upper support beam extending between ends of diametrically positioned support ribs, said beam including means rotatably supporting the cylindrical rotor therefrom; and means depending from the upper support beam maintaining the upper end plate independently suspended in spaced relation from the rotor and rotor housing.

2. Rotary regenerative heat exchange apparatus as defined in claim 1 wherein the means supporting the upper end plate and the cylindrical rotor are centrally located with respect thereto whereby the peripheral edges of the end plate and rotor are free to deform radially and axially in response to temperature variations.

3. Rotary regenerative heat exchange apparatus as defined in claim 1 wherein a lower support beam extends between lower ends of the diametrically positioned support ribs, said beam having support means arranged to support the lower end plate independently of said housing.

4. Rotary regenerative heat exchange apparatus as defined in claim 3 wherein the means supporting the lower end plate is fixed to the central portion of said end plate to permit unencumbered distortion of the peripheral edge thereof.

References Cited in the file of this patent

UNITED STATES PATENTS

| | | |
|---|---|---|
| 1,716,132 | Hodgkinson | June 4, 1929 |
| 1,891,607 | Rainey | Dec. 20, 1932 |
| 2,010,930 | Rowe | Aug. 13, 1935 |
| 2,229,691 | Boestad | Jan. 28, 1941 |
| 2,337,956 | Yerrick et al. | Dec. 28, 1943 |
| 2,361,692 | Karlsson et al. | Oct. 31, 1944 |
| 2,468,826 | Karlsson et al. | May 3, 1949 |
| 2,480,277 | Yerrick | Aug. 30, 1949 |
| 2,549,583 | Eckersley | Apr. 17, 1951 |

FOREIGN PATENTS

| | | |
|---|---|---|
| 500,682 | Great Britain | Feb. 14, 1939 |